(12) United States Patent
Uehara

(10) Patent No.: US 11,655,859 B2
(45) Date of Patent: May 23, 2023

(54) POWER TRANSMISSION DEVICE

(71) Applicant: EXEDY Corporation, Neyagawa (JP)

(72) Inventor: Hiroshi Uehara, Neyagawa (JP)

(73) Assignee: Exedy Corporation, Neyagawa (JP)

( * ) Notice: Subject to any disclaimer, the term of this patent is extended or adjusted under 35 U.S.C. 154(b) by 198 days.

(21) Appl. No.: 17/308,954

(22) Filed: May 5, 2021

(65) Prior Publication Data

US 2021/0381556 A1 Dec. 9, 2021

(30) Foreign Application Priority Data

Jun. 5, 2020 (JP) .............................. JP2020-098160

(51) Int. Cl.
*F16F 15/123* (2006.01)
*F16D 7/02* (2006.01)
*F16D 3/12* (2006.01)

(52) U.S. Cl.
CPC ............... *F16D 7/025* (2013.01); *F16D 3/12* (2013.01); *F16F 15/12353* (2013.01); *F16F 2230/36* (2013.01); *F16F 2232/02* (2013.01)

(58) Field of Classification Search
CPC ...... F16D 7/025; F16D 3/12; F16F 15/12353; F16F 2230/36; F16F 2232/02
USPC ....................... 464/46, 68.1; 192/110 R, 212
See application file for complete search history.

(56) References Cited

U.S. PATENT DOCUMENTS

| 3,159,987 | A | * | 12/1964 | Thompson | ................ F16D 3/50 |
| | | | | | 464/68.1 |
| 6,471,593 | B1 | * | 10/2002 | Hanke | ............... F16F 15/13438 |
| 8,597,130 | B2 | * | 12/2013 | Kombowski | ....... F16F 15/1203 |
| 8,647,211 | B2 | * | 2/2014 | Doman | ................... F16D 7/025 |
| | | | | | 464/46 |

FOREIGN PATENT DOCUMENTS

JP 2011-027122 A 2/2011

* cited by examiner

*Primary Examiner* — Greg Binda
(74) *Attorney, Agent, or Firm* — United IP Counselors, LLC

(57) ABSTRACT

A power transmission device includes a flywheel and a damper device. The flywheel includes a plurality of fixation holes. The damper device includes an input rotary member, an output rotary member, and a pair of first elastic members. The input rotary member and output rotary member each include a plurality of assembling holes disposed in corresponding positions to the plurality of fixation holes of the flywheel. The plurality of assembling holes are arranged in a circumferential direction such that two pairs of the assembling holes, each pair including two adjacent assembling holes, are each disposed at a larger interval than remaining assembling holes to produce a pair of accommodation spaces. A pair of first accommodation portions, accommodating the pair of first elastic members, is disposed radially outside the pair of accommodation spaces.

9 Claims, 4 Drawing Sheets

POWER TRANSMISSION DEVICE

CROSS-REFERENCE TO RELATED APPLICATIONS

This application claims priority to Japanese Patent Application No. 2020-098160, filed Jun. 5, 2020. The entire contents of that application are incorporated by reference herein in their entirety.

TECHNICAL FIELD

The present invention relates to a power transmission device.

BACKGROUND ART

A type of hybrid vehicle including an engine and an electric motor, for instance, uses such a damper device having a torque limiter function (exemplary power transmission device) as described in Japan Laid-open Patent Application Publication No. 2011-27122 in order to prevent transmission of an excessive torque from an output side to an engine side in engine start and so forth.

The damper device described in Japan Laid-open Patent Application Publication No. 2011-27122 is provided with a damper part including a pair of plates, a hub flange, and a plurality of coil springs. The damper device is further provided with a torque limiter disposed on an outer peripheral side of the damper part. A plate, composing part of the torque limiter, is fixed to a flywheel by at least one rivet. Besides, the flywheel is configured to be attached to a crankshaft of the engine by a plurality of bolts.

In such a damper device to which the flywheel is attached as described in Japan Laid-open Patent Application Publication No. 2011-27122, the plural bolts are used for fixing the flywheel to the crankshaft. Besides, a plurality of holes, enabling the plural bolts to penetrate therethrough, are required to be provided in, for instance, a hub flange of the damper device. Preferably, the plural bolts are attached to positions on the circumference of an imaginary circle with as large a radius as possible in order to fix the flywheel with high strength.

When the bolts are thus attached to the positions on the circumference of the imaginary circle with as large a radius as possible, the holes enabling the bolts to penetrate therethrough are provided as much on an outer peripheral side as possible in the hub flange. Because of this, window holes for accommodating the coil springs are also provided as much on the outer peripheral side as possible in the hub flange. This results in increase in size of the entire device.

BRIEF SUMMARY

It is an object of the present invention to enable a power transmission device including a flywheel and a damper device to exert high strength for fixing the flywheel, and simultaneously, to avoid increase in size thereof.

(1) A power transmission device according to the present invention includes a flywheel and a damper device. The flywheel includes a plurality of fixation holes and is fixed to a drive source-side member. The damper device is fixed to the flywheel, transmits a torque inputted thereto from the flywheel to an output-side member, and attenuates torque fluctuations. Besides, the damper device includes an input rotary member, an output rotary member, and a pair of first elastic members. The output rotary member is rotatable relative to the input rotary member. The pair of first elastic members elastically couples the input rotary member and the output rotary member in a rotational direction.

Moreover, the input rotary member and the output rotary member each include a plurality of assembling holes and a pair of first accommodation portions. The plurality of assembling holes are disposed in corresponding positions to the plurality of fixation holes of the flywheel. The pair of first accommodation portions accommodates the pair of first elastic members. Furthermore, the plurality of assembling holes are arranged in a circumferential direction such that two pairs of the plurality of assembling holes, each pair including two adjacent assembling holes among the plurality of assembling holes, are each disposed at a larger interval than remaining assembling holes of the plurality of assembling holes to produce a pair of accommodation spaces. Yet further, the pair of first accommodation portions is disposed radially outside the pair of accommodation spaces.

In the present power transmission device, fixation members such as bolts are inserted into the plural fixation holes of the flywheel through the plural assembling holes of the input rotary member and those of the output rotary member. Accordingly, the flywheel and the damper device are fixed to the drive source-side member such as a crankshaft.

The plural assembling holes are herein arranged in the circumferential direction at unequal pitches, and the pair of accommodation spaces is provided as part of the spaces produced between the plural assembling holes. Besides, the pair of first accommodation portions of the output member is disposed radially outside the pair of accommodation spaces. Hence, even when the plural assembling holes are provided in positions on the circumference of an imaginary circle with a large radius defined by bolt attached positions, the pair of first accommodation portions can be disposed in relatively radially inner positions. Because of this, the present power transmission device is enabled to exert high strength for fixing the flywheel, and simultaneously, to avoid increase in size thereof.

(2) Preferably, the plurality of assembling holes include a plurality of first assembling holes and a plurality of second assembling holes. The first assembling holes are arranged in the circumferential direction at a first interval. The second assembling holes are arranged in the circumferential direction at the first interval. Each of the two pairs of the plurality of assembling holes including the first assembling hole and the second assembling hole are disposed at a second interval between the first assembling hole and the second assembling hole, which is larger than the first interval. Besides, the pair of accommodation spaces is each produced between the first assembling hole and the second assembling hole.

(3) Preferably, the damper device further includes a pair of second elastic members elastically coupling the input rotary member and the output rotary member in the rotational direction. The input rotary member and the output rotary member each further include a pair of second accommodation portions. One of the pair of second accommodation portions is disposed radially outside the plurality of first assembling holes, while the other of the pair of second accommodation portions is disposed radially outside the plurality of second assembling holes. The pair of second accommodation portions accommodates the pair of second elastic members.

(4) Preferably, at least the output member is configured such that one of the pair of second accommodation portions is communicated with at least one of the plurality of first assembling holes disposed radially inside thereof, while the other of the pair of second accommodation portions is communicated with at least one of the plurality of second assembling holes disposed radially inside thereof.

Here, the pair of second accommodation portions is each communicated with at least one of the plural assembling holes of the output rotary member. Hence, even when the pair of second accommodation portions is provided, increase in size of the device can be avoided.

(5) Preferably, the plurality of assembling holes each allow a fixation member to extend therethrough. The fixation member fixes the flywheel to the drive source-side member.

(6) Preferably, the input rotary member includes a first plate and a second plate. The first and second plates are fixed to each other while being disposed at an axial interval. Besides, the output rotary member includes a hub and a flange. The hub is coupled to the output-side member. The flange extends radially outward from an outer peripheral part of the hub. The flange is disposed between the first plate and the second plates. In this case, the first plate, the second plate, and the flange are each provided with the plurality of assembling holes.

(7) Preferably, the damper device further includes a torque limiter unit fixed to an outer peripheral part of the input rotary member. The torque limiter unit is fixed at an outer peripheral part thereof with the flywheel. Besides, the torque limiter unit transmits the torque when the torque has a magnitude falling within a preset range.

(8) Preferably, the torque limiter unit includes a cover member, a friction member, a pressing member, and a release mechanism. The cover member is fixed to the flywheel. The friction member is fixed to the input rotary member. The pressing member presses the friction member against the cover member. The release mechanism releases a pressing force applied to the friction member by the pressing member.

When the torque limiter unit is actuated, the flywheel and the damper unit are rotated relative to each other. In this case, the fixation holes of the flywheel and the assembling holes of the damper device are displaced in rotational phase from each other, whereby the fixation members such as bolts, fastened to the flywheel, cannot be removed therefrom.

In view of this, the release mechanism is provided to be capable of releasing the pressing force applied by the pressing member in the torque limiter unit. When the release mechanism releases the pressing force applied by the pressing member, the damper device is made freely rotatable with respect to the flywheel. Consequently, positional alignment is made easy between the fixation holes of the flywheel and the assembling holes of the damper device, whereby the flywheel and the damper device can be removed from the crankshaft or so forth.

(9) Preferably, the release mechanism includes a screw hole and a screw member. The screw hole is provided in the cover member. The screw member is screwed into the screw hole to release the pressing force applied by the pressing member.

Overall, according to the present invention described above, a power transmission device including a flywheel and a damper device is enabled to exert high strength for fixing the flywheel, and simultaneously, to avoid increase in size thereof.

DETAILED DESCRIPTION

[Entire Configuration]

Figure 1:
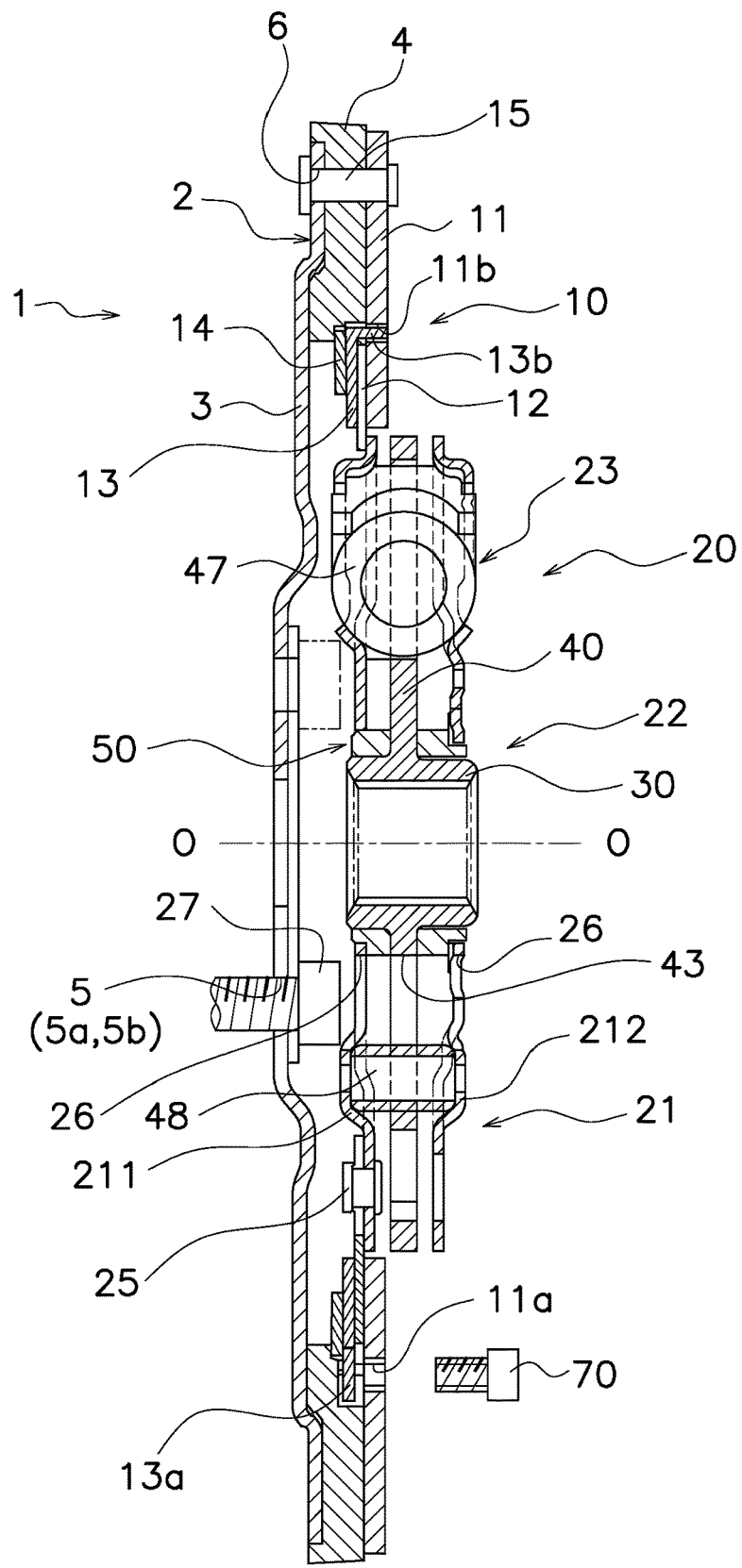
FIG. 1 is a cross-sectional view of a torque limiter embedded damper device according to a preferred embodiment of the present invention.
Figure 2:
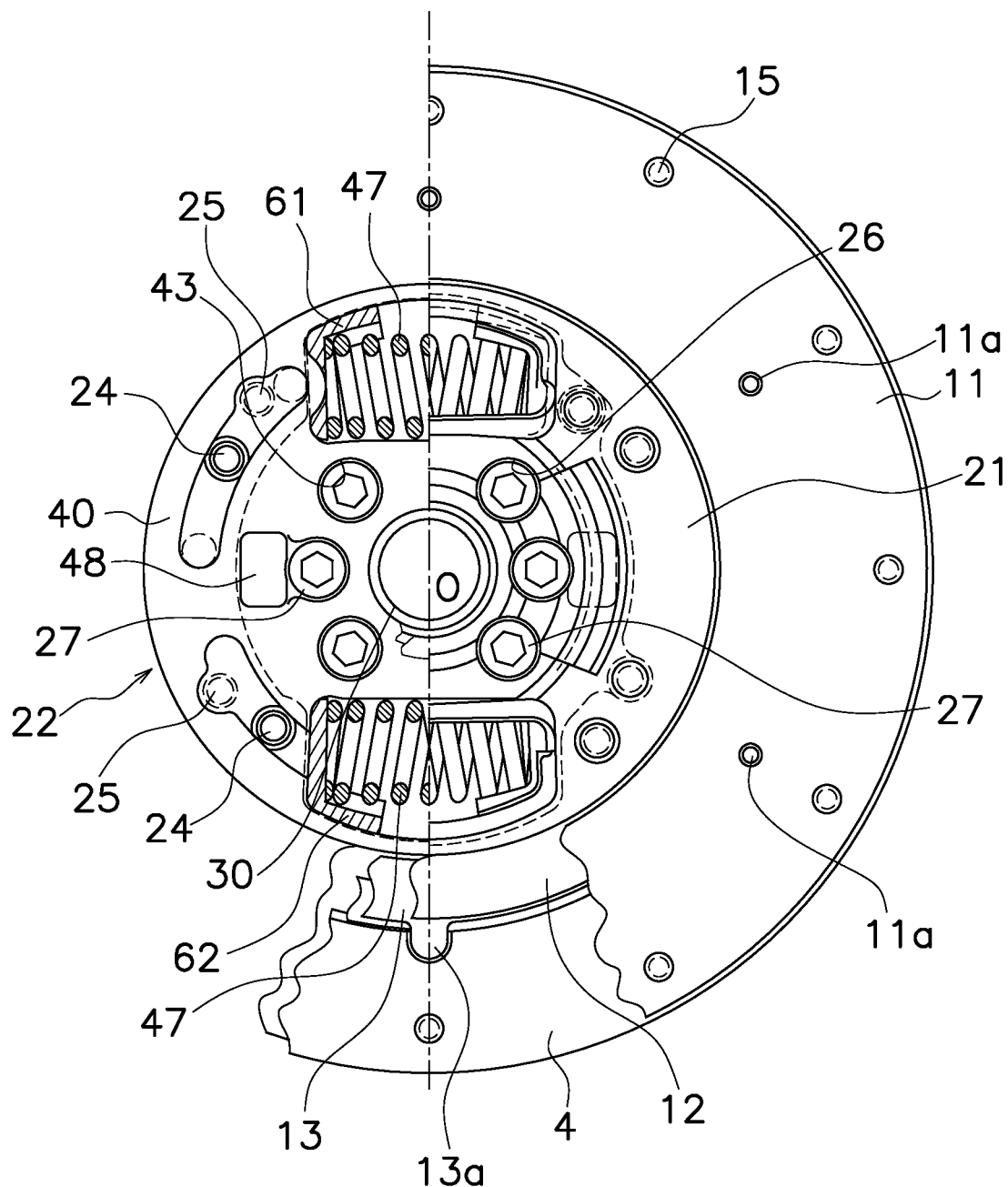
FIG. 2 is a front view of the damper device shown in FIG. 1, partially in section.

FIG. 1 is a cross-sectional view of a torque limiter embedded damper device 1 (which is an exemplary power transmission device and will be hereinafter simply referred to as "damper device 1") according to a preferred embodiment of the present invention. On the other hand, FIG. 2 is a front view of the damper device 1 in a condition that some constituent members are detached therefrom or are not illustrated in part. In FIG. 1, line O-O indicates a rotational axis. In FIG. 1, an engine is disposed on the left side of the damper device 1, whereas a drive unit, including an electric motor, a transmission, and so forth, is disposed on the right side of the damper device 1.

It should be noted that in the following explanation, the term "axial direction" refers to an extending direction of the rotational axis O of the damper device 1. On the other hand, the term "circumferential direction" refers to a circumferential direction of an imaginary circle about the rotational axis O, whereas the term "radial direction" refers to a radial direction of the imaginary circle about the rotational axis O. It should be noted that the circumferential direction is not required to be perfectly matched with that of the imaginary circle about the rotational axis O, and is conceptualized as encompassing, for instance, a right-and-left direction defined based on each of window portions and each of window holes, both of which are illustrated in FIG. 2. Likewise, the radial direction is not required to be perfectly matched with a diameter direction of the imaginary circle about the rotational axis O, and is conceptualized as encompassing, for instance, an up-and-down direction defined based on each window portion and each window hole, both of which are illustrated in FIG. 2.

The damper device 1 is a device provided between a crankshaft of the engine as an exemplary drive source-side member and an input shaft of the drive unit (both of which are not illustrated in the drawings) in order to limit a torque transmitted between the engine and the drive unit and attenuate rotational fluctuations. The damper device 1 includes a flywheel 2, a torque limiter unit 10, and a damper unit 20.

[Flywheel 2]

The flywheel 2 includes a drive plate 3 disposed on the engine side and an inertia member 4.

The drive plate 3 is made in the shape of a disc. The drive plate 3 includes six fixation holes 5 in an inner peripheral part thereof and includes a plurality of rivet holes 6 in an outer peripheral part thereof. The six fixation holes 5 are arranged on the circumference of an imaginary circle with a constant radius defined by bolt attached positions. The six fixation holes 5 are composed of three first fixation holes 5a and three second fixation holes 5b. It should be noted that the fixation holes 5 of the flywheel 2 are disposed in corresponding positions to assembling holes 26 provided in an input-side plate 21 (to be described) and assembling holes 43 provided in a hub flange 22 (to be described). Hence, the fixation holes 5 will be described below in detail.

The inertia member 4 is made in the shape of an annulus. The inertia member 4 is fixed to an outer peripheral part of the drive plate 3, while being disposed on the opposite side of the engine through the drive plate 3.

[Torque Limiter Unit 10]

The torque limiter unit 10 is disposed on the outer peripheral side of the damper unit 20. The torque limiter unit 10 limits a torque transmitted between the flywheel 2 and the damper unit 20. The torque limiter unit 10 includes a damper cover 11 (exemplary cover member), a friction plate 12 (exemplary friction member), a pressure plate 13, and a cone spring 14 (exemplary pressing member).

The damper cover 11 is fixed to the drive plate 3 together with the inertia member 4 by a plurality of rivets 15. The pressure plate 13 is disposed to interpose the friction plate 12 together with the damper cover 11 therebetween. The cone spring 14 is disposed between the pressure plate 13 and the inertia member 4. The cone spring 14 presses the pressure plate 13 at the inner peripheral end thereof, while being supported at the outer peripheral end thereof by the inner peripheral end of the inertia member 4. In other words, the cone spring 14 presses the friction plate 12 against the damper cover 11 through the pressure plate 13.

As shown in FIGS. 1 and 2, the damper cover 11 is herein provided with a plurality of screw holes 11a for releasing a pressing force. The screw holes 11a axially penetrate the damper cover 11. The screw holes 11a are provided to be located further radially outside the outer peripheral surface of the friction plate 12. On the other hand, the pressure plate 13 is approximately equal in outer diameter to the friction plate 12. Besides, the pressure plate 13 is provided with a plurality of protruding portions 13a on the outer peripheral surface thereof. The protruding portions 13a protrude further radially outward therefrom. The protruding portions 13a are provided in the same positions as the screw holes 11a of the damper cover 11, respectively, in both radial and circumferential directions.

It should be noted that as shown in FIG. 1, the pressure plate 13 is provided with a plurality of protrusions on the outer peripheral end thereof. The protrusions are bent toward the damper cover 11 and function as a plurality of engaging portions 13b. The engaging portions 13b are inserted into holes 11b provided in the damper cover 11. Therefore, the pressure plate 13 is made non-rotatable relative to the damper cover 11.

[Damper Unit 20]

The damper unit 20 is composed of the input-side plate 21 (exemplary input rotary member), the hub flange 22 (exemplary output rotary member), and a damper part 23 disposed between the input-side plate 21 and the hub flange 22.

<Input-Side Plate 21>

Figure 3:
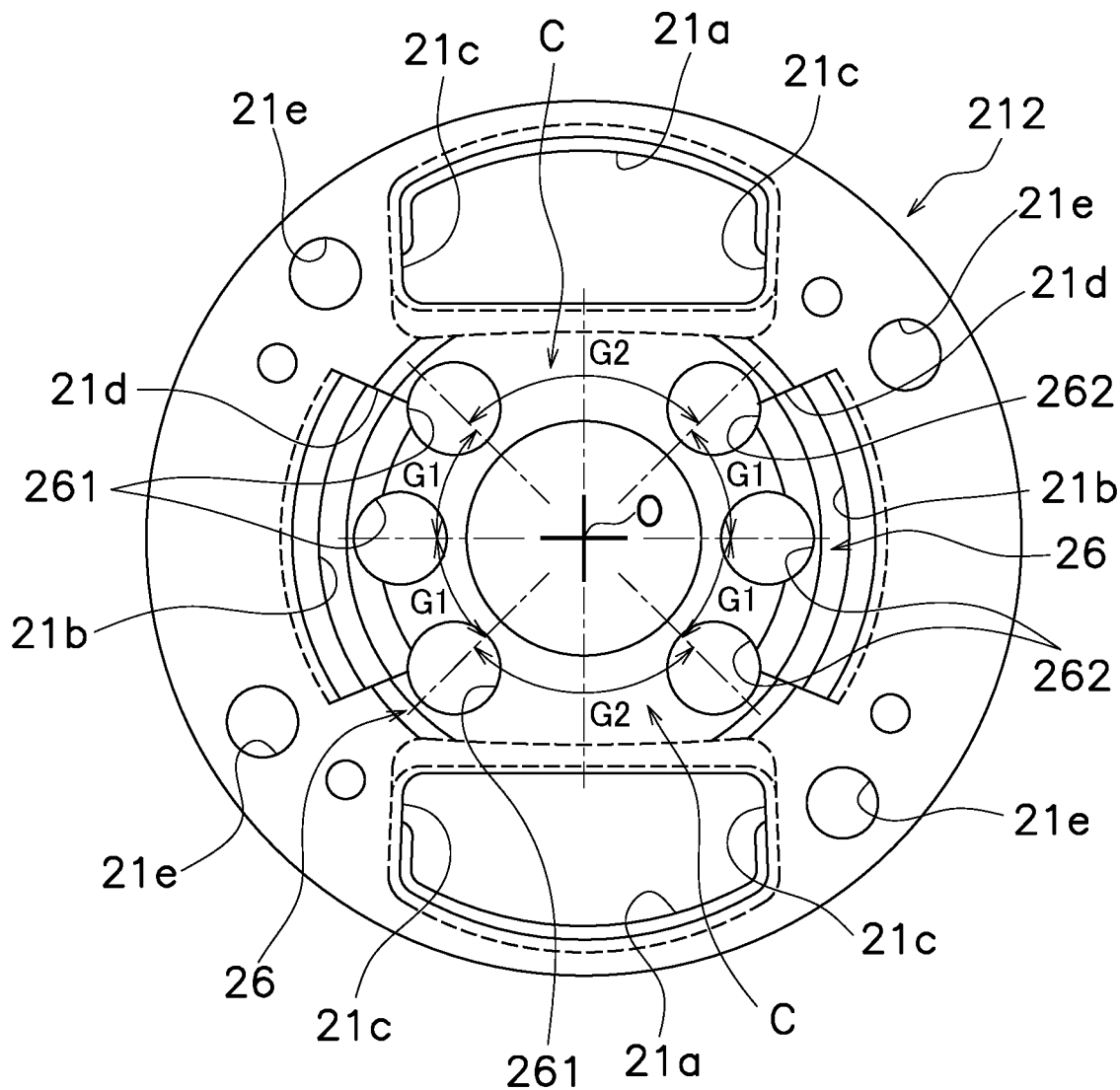
FIG. 3 is a front view of a second plate.

The input-side plate 21 includes a first plate 211 and a second plate 212 (both of which will be hereinafter collectively referred to as "the input-side plate 21" on an as-needed basis). As shown in FIG. 3, each of the first and second plates 211 and 212 is an annular member including a center hole. It should be noted that FIG. 3 depicts only the second plate 212 but the basic configuration of the second plate 212 is similarly true of the first plate 211. The first and second plates 211 and 212 are fixed to each other at a predetermined axial interval by four stop pins 24 (see FIG. 2). Therefore, the first and second plates 211 and 212 are immovable relative to each other in both axial and rotational directions. Besides, as shown in FIG. 1, the friction plate 12 is fixed at the inner peripheral part thereof to the outer peripheral part of the first plate 211 by a plurality of rivets 25.

As shown in FIG. 3, each of the first and second plates 211 and 212 is provided with a pair of first window portions 21a (exemplary first accommodation portions) and a pair of second window portions 21b (exemplary second accommodation portions). The pair of first window portions 21a is disposed in opposition to each other through the rotational axis O. FIG. 3 depicts the pair of first window portions 21a and the pair of second window portions 21b in the second plate 212 but the configurations of the window portions 21a and 21b are similarly true of those in the first plate 211. The pair of first window portions 21a is formed by cutting and raising each plate 211, 212. Each first window portion 21a includes a pair of pressing surfaces 21c on both circumferential end surfaces thereof and includes a pair of support portions on the outer and inner peripheral edges thereof. On the other hand, the pair of second window portions 21b is disposed in opposition to each other through the rotational axis O, while being displaced from the pair of first window portions 21a at an angular interval of 90 degrees. The pair of second window portions 21b is a pair of openings each having a circular-arc shape. Each second window portion 21b circumferentially extends and axially penetrates each plate 211, 212. Each second window portion 21b includes a pair of pressing surfaces 21d on both circumferential end surfaces thereof.

Each of the first and second plates 211 and 212 is provided with four rivet holes 21e and six assembling holes 26. The rivet holes 21e are holes for swaging the rivets 25 and are provided in corresponding positions to the rivets 25. The six assembling holes 26 are holes for fixing the flywheel 2 to the crankshaft and are sized to enable bolts 27 (see FIGS. 1 and 2) to penetrate therethrough, respectively. The layout of the assembling holes 26 will be described below.

<Hub Flange 22>

The hub flange 22 is a member for transmitting a torque, inputted thereto from the input-side plate 21, to an output-side device. As shown in FIGS. 1 and 2, the hub flange 22 includes a hub 30 and a flange 40.

The hub 30 has a tubular shape and extends inside the center holes of the first and second plates 211 and 212. The hub 30 is provided with a spline hole in the inner peripheral part thereof, whereby an output-side member is enabled to be spline-coupled to the spline hole.

Figure 4:
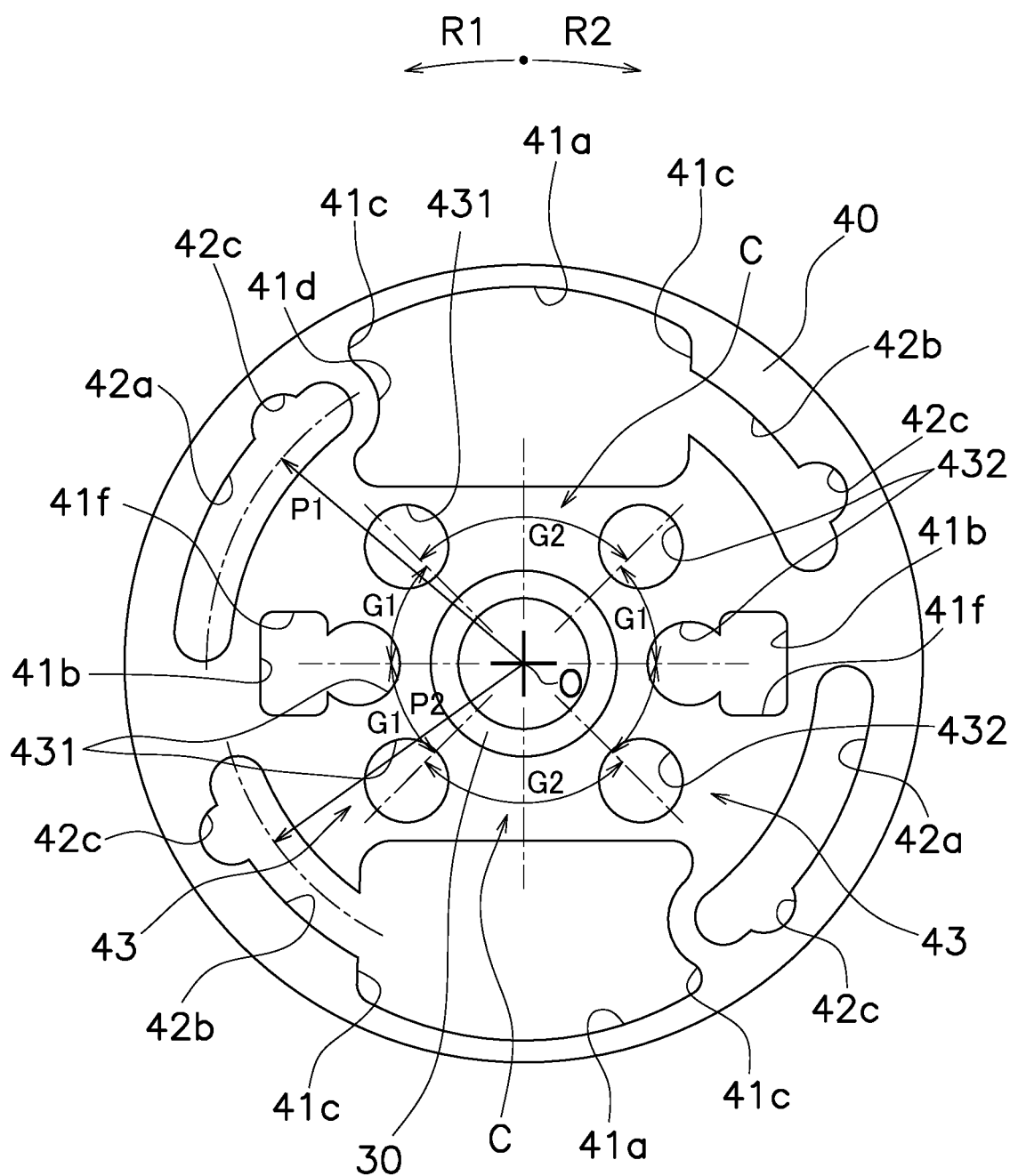
FIG. 4 is a front view of a hub flange.

The flange 40 is made in the shape of a disc extending radially outward from the outer peripheral surface of the hub 30 as shown in FIGS. 2 and 4 and is disposed axially between the first plate 211 and the second plate 212. The flange 40 includes a pair of first window holes 41a (exemplary first accommodation portions), a pair of second window holes 41b (exemplary second accommodation portions), a pair of first stopper holes 42a, a pair of second stopper holes 42b, the six assembling holes 43 for fastening the bolts 27.

The pair of first window holes 41a is disposed in opposition to each other through the rotational axis O, while being provided in corresponding positions to the pair of first window portions 21a of the first plate 211 and that of the second plate 212. Each first window hole 41a includes a pair of pressing surfaces 41c on both circumferential end surfaces thereof. Besides, in each first window hole 41a, circumferentially R1-side (hereinafter simply referred to as "R1 side") one of the pair of pressing surfaces 41c includes a protruding portion 41d protruding to bulge toward the other pressing surface 41c opposed thereto (i.e., so as to bulge in the circumferential direction).

The pair of second window holes 41b is disposed in opposition to each other through the rotational axis O, while being displaced from the pair of first window holes 41a at an angular interval of 90 degrees. In other words, the pair of second window holes 41b is provided in corresponding positions to the pair of second window portions 21b of the first plate 211 and that of the second plate 212. Each second window hole 41b is made in the shape of a rectangle, and a radial position of each second window hole 41b (the middle position of the radial width of the hole) is defined radially inside the radially center position in each first window hole 41a. Each second window hole 41b includes a pair of pressing surfaces 41f on both circumferential end surfaces thereof. The distance between the pair of pressing surfaces 41f is set to be shorter than that between the pair of pressing surfaces 21d of each second window portion 21b in the input-side plate 21.

As shown in FIG. 4, the pair of first stopper holes 42a is a pair of elongated holes each extending in a circular-arc shape on the R1 side of each first window hole 41a. Each first stopper hole 42a is provided apart from the first window hole 41a adjacent thereto. Each first stopper hole 42a extends, at one end thereof located apart from the adjacent first window hole 41a, to a position radially outside the second window hole 41b near thereto. On the other hand, each first stopper hole 42a extends, at the other end thereof located closer to the adjacent first window hole 41a, toward the protruding portion 41d in the adjacent first window hole 41a.

The pair of second stopper holes 42b is a pair of elongated holes each extending in a circular-arc shape on a circumferentially R2 side (hereinafter simply referred to as "R2 side") of each first window hole 41a. Each second stopper hole 42b is communicated at the R1-side end thereof with the radially intermediate part of each first window hole 41a.

Besides, each of the first and second stopper holes 42a and 42b is provided with a cutout 42c on a part thereof located in the vicinity of the R2-side end thereof. The cutout 42c is curvedly recessed to the outer peripheral side. The cutouts 42c are provided in corresponding positions to the pairs of rivet holes 21e provided in the input-side plate 21. Each cutout 42c is similar in size to each rivet hole 21e. Each rivet 25 can be swaged through each cutout 42c and each pair of rivet holes 21e. Moreover, the first stopper holes 42a and the second stopper holes 42b are axially penetrated by the stop pins 24, respectively. Because of this, the input-side plate 21 and the hub flange 22 are rotatable relative to each other within a range that each stop pin 24 is movable within each stopper hole 42a, 42b. In other words, the stop pins 24 and the stopper holes 42a and 42b compose a stopper mechanism 45. The input-side plate 21 and the hub flange 22 are prevented from rotating relative to each other when each stop pin 24 makes contact with one end surface of each stopper hole 42a, 42b.

The radial positions of the pair of first window holes 41a are herein the same. However, a pitch radius P1 of each first stopper hole 42a (a radius at a radially middle part of each first stopper hole 42a) is greater than a pitch radius P2 of each second stopper hole 42b. In other words, the first stopper holes 42a and the second stopper holes 42b are provided in radial positions displaced from each other.

Because of this, each first stopper hole 42a can be extended at the R2-side end thereof toward the radially middle part (i.e., the protruding portion 41d) of the first window hole 41a adjacent thereto. On the other hand, each second stopper hole 42b can be communicated at the R1-side end thereof with the radially middle part of the first window hole 41a adjacent thereto.

[Layout of Fixation Holes 5 and Assembling Holes 26 and 43]

The layout of the fixation holes 5 and the assembling holes 26 and 43 will be explained with reference to FIGS. 3 and 4. It should be noted that the fixation holes 5 (shown in FIG. 1) are provided in the corresponding positions to the assembling holes 26, 43, although the fixation holes 5 are not shown in FIGS. 3 and 4.

The six assembling holes 26, 43 are arranged on the circumference of an imaginary circle with a constant radius. The six assembling holes 26, 43 are composed of three first assembling holes 261, 431 and three second assembling holes 262, 432. The three first assembling holes 261, 431 and the three second assembling holes 262, 432 are disposed in opposition to each other through the rotational axis O. Besides, the three first assembling holes 261, 431 are disposed at first intervals G1, while the three second assembling holes 262, 432 are disposed at the first intervals G1. Moreover, each pair of first and second assembling holes 261, 431 and 262, 432 adjacent to each other is disposed at a second interval G2 larger than the first interval G1.

In other words, among the six assembling holes 26, 43, two pairs of adjacent accommodation holes 261, 431 and 262, 432 are each disposed at a larger interval than remaining pairs, whereby a pair of accommodation spaces C is each produced between each of the two pairs (at the interval G2). The pair of accommodation spaces C is provided in opposition to each other through the rotational axis O. Besides, the pair of first window holes 41a is provided radially outside the pair of accommodation spaces C.

It should be noted that in the flange 40 of the hub flange 22, circumferentially middle one of the three first assembling holes 431 is provided on the radially inner side of one of the pair of second window holes 41b. Besides, the circumferentially middle one of the first assembling holes 431 is communicated at the outer peripheral part thereof with the one of the pair of second window holes 41b. This configuration is similarly true of the second assembling holes 432. Hence, one of the three second assembling holes 432 is communicated at the outer peripheral part thereof with the other of the pair of the second window holes 41b.

<Damper Part 23>

The damper part 23 is a mechanism for elastically coupling the input-side plate 21 and the hub flange 22 in the rotational direction. As shown in FIGS. 1 and 2, the damper part 23 includes a pair of coil springs 47 (exemplary first elastic members), a pair of resin members 48 (exemplary second elastic members), and a hysteresis generating mechanism 50.

The pair of coil springs 47 is accommodated in the pair of first window holes 41a of the flange 40, respectively, whereas the pair of resin members 48 is accommodated in the pair of second window holes 41b of the flange 40, respectively. Besides, the pair of coil springs 47 is axially and radially supported by the pair of first window portions 21a of each of the first and second plates 211 and 212, respectively, whereas the pair of resin members 48 is axially and radially supported by the pair of second window portions 21b of each of the first and second plates 211 and 212, respectively.

It should be noted that as shown in FIG. 2, each resin member 48 is disposed in each second window portion 21b of the input-side plate 21 through circumferential gaps. On the other hand, each resin member 48 is disposed in each second window hole 41b of the flange 40 without any circumferential gap.

A first spring seat 61 is provided on the R1-side end surface of each coil spring 47, whereas a second spring seat 62 is provided on the R2-side end surface of each coil spring 47. The first and second spring seats 61 and 62 support the end surfaces of each coil spring 47, while being supported by each pair of pressing surfaces 21c of the input-side plate 21 and each pair of pressing surfaces 41c of the hub flange 22. The first spring seat 61 is provided with a recess recessed in a circular-arc shape toward each coil spring 47. The recess is provided with a hole circumferentially penetrating a middle part thereof. Furthermore, the protruding portion 41d of each first window hole 41a of the flange 40 is fitted into the recess.

[Assemblage of Torque Limiter Unit 10 and Damper Unit 20]

First, in assemblage of the damper device 1, the torque limiter unit 10 and the damper unit 20 are assembled separately. Thereafter, the inner peripheral part of the friction plate 12 in the torque limiter unit 10 and the outer peripheral part of the first plate 211 are fixed to each other by swaging the rivets 25.

The first plate 211 is provided with the rivet holes 21e, whereas the flange 40 is provided with the cutouts 42c for rivet swaging. Hence, each rivet 25 can be herein swaged by a swaging tool contacted thereto by utilizing each pair of rivet hole 21e and cutout 42c.

[Fixation of Damper Device 1 to Crankshaft]

The torque limiter unit 10 and the damper unit 20, assembled as described above, are fixed to the flywheel 2 by the rivets 15. Then, when these components assembled as the damper device 1 are entirely fixed to the crankshaft, the six bolts 27 are screwed into holes of the crankshaft, while being inserted into the fixation holes 5 of the flywheel 2 by utilizing the assembling holes 26 of the first plate 211, the assembling holes 43 of the hub flange 22, and the assembling holes 26 of the second plate 211. Accordingly, the damper device 1 can be fixed to the crankshaft of the engine.

[Actions]

A torque, transmitted from the engine to the flywheel 2, is inputted to the damper unit 20 through the torque limiter unit 10. In the damper unit 20, the torque is inputted to the input-side plate 21, to which the friction plate 12 of the torque limiter unit 10 is fixed, and is then transmitted to the hub flange 22 through the coil springs 47 and the resin members 48. Subsequently, power is transmitted from the hub flange 22 to the electric motor, the transmission, a power generator, and so forth disposed on the output side.

Incidentally, for instance in starting the engine, chances are that an excessive torque is transmitted from the output side to the engine because the amount of inertia is large on the output side. In such a case, the magnitude of torque to be transmitted to the engine side is limited to a predetermined value or less by the torque limiter unit 10.

[Removal of Damper Device 1 from Crankshaft]

When the torque limiter unit 10 is actuated during such an action described above, the flywheel 2 and the damper unit 20 are rotated relative to each other. In this case, the fixation holes 5 in the flywheel 2 and triads of assembling holes 26, 43, 26 in the damper unit 20 are displaced in rotational phase from each other. Therefore, even when the tool is inserted through each triad of assembling holes 26, 43, 26 in the damper unit 20, each bolt 27 attached to the flywheel 2 cannot be detached therefrom.

Hence, in order to release a pressing force applied by the cone spring 14 in the torque limiter unit 10, release bolts 70 are screwed into the screw holes 11a that are provided in the damper cover 11 to release the pressing force. While gradually screwed, the releasing bolts 70 make contact at the distal ends thereof with the protruding portions 13a of the pressure plate 13, respectively. Accordingly, the pressure plate 13 is pressed toward the engine. Here, the damper cover 11 and the pressure plate 13 are non-rotatable relative to each other. Hence, the screw holes 11a and the protruding portions 13a are not displaced in rotational phase from each other. Consequently, the pressing force is released that has been applied by the cone spring 14 to press the friction plate 12 through the pressure plate 13. When the pressing force applied by the cone spring 14 is released, the damper unit 20 is made freely rotatable with respect to the flywheel 2 and the damper cover 11.

In such a condition as described above, by rotating the damper unit 20, positional alignment is made easy between the triads of assembling holes 26, 43, 26 in the damper unit 20 and the fixation holes 5 in the flywheel 2. Then, when each bolt 27 is unscrewed by the tool inserted through each triad of assembling holes 26, 43 and 26, the damper device 1 can be removed from the crankshaft.

Other Preferred Embodiments

The present invention is not limited to the preferred embodiment described above, and a variety of changes or modifications can be made without departing from the scope of the present invention.

(a) The configuration of the torque limiter unit 10 and that of the damper unit 20 are not limited to those in the preferred embodiment described above. Besides, the present invention is also applicable to a type of damper device not provided with the torque limiter unit 10.

(b) The number of the fixation holes 5 in the flywheel 2 and that of the assembling holes 26, 43 in the damper unit 20 are not limited to those in the preferred embodiment described above.

(c) In the preferred embodiment described above, the damper part 23 is provided with the resin members 48 as well as the coil springs 47. However, a type of damper part, provided with only the coil springs 47, may be employed instead.

(d) In the preferred embodiment described above, each second window portion 21b and the assembling holes 26 are not communicated with each other in the input-side plate 21. However, the assembling hole 261, 262, located radially inside each second window portion 21b, may be communicated with each second window portion 21b.

REFERENCE SIGNS LIST

2 Flywheel
5 Fixation hole
10 Torque limiter unit
11 Damper cover (cover member)
11a Screw hole for releasing pressing force
12 Friction plate (friction member)
13 Pressure plate
14 Cone spring (pressing member)
20 Damper unit
21 Input-side plate (input rotary member)
211 First plate
212 Second plate
21a First window portion (first accommodation portion)
21b Second window portion (second accommodation portion)
22 Hub flange (output rotary member)
26, 43 Assembling hole
261, 431 First assembling hole
262, 432 Second assembling hole
27 Bolt (fixation member)
30 Hub
40 Flange 41a First window hole (first accommodation portion)
41b Second window hole (second accommodation portion)
47 Coil Spring (first elastic member)
48 Resin member (second elastic member)
70 Bolt for releasing pressing force
C Accommodation space

What is claimed is:

1. A power transmission device comprising:
a flywheel including a plurality of fixation holes, the flywheel configured to be fixed to a drive source-side member; and
a damper device fixed to the flywheel, the damper device configured to transmit a torque inputted thereto from the flywheel to an output-side member, the damper device configured to attenuate torque fluctuations, wherein
the damper device includes an input rotary member, an output rotary member, and a pair of first elastic members, the output rotary member rotatable relative to the input rotary member, the pair of first elastic members configured to elastically couple the input rotary member and the output rotary member in a rotational direction,
the input rotary member and the output rotary member each include a plurality of assembling holes and a pair of diametrically opposed first accommodation portions, the plurality of assembling holes disposed in corresponding positions to the plurality of fixation holes of the flywheel, the pair of first accommodation portions accommodating the pair of first elastic members,
the plurality of assembling holes are arranged in a circumferential direction such that two pairs of the plurality of assembling holes, each pair including two adjacent assembling holes among the plurality of assembling holes, are each disposed at a larger interval than remaining assembling holes of the plurality of assembling holes to produce a pair of diametrically opposed accommodation spaces, the pair of diametrically opposed accommodation spaces being rotationally aligned with the pair of first accommodation portions, and
the pair of first accommodation portions is disposed radially outside the pair of accommodation spaces.

2. The power transmission device according to claim 1, wherein
the plurality of assembling holes include a plurality of first assembling holes and a plurality of second assembling holes, the first assembling holes arranged in the circumferential direction at a first interval, the second assembling holes arranged in the circumferential direction at the first interval, each of the two pairs of the plurality of assembling holes including the first assembling hole and the second assembling hole disposed at a second interval between the first assembling hole and the second assembling hole, the second interval being larger than the first interval, and
the pair of accommodation spaces is each produced between the first assembling hole and the second assembling hole.

3. The power transmission device according to claim 1, wherein
the damper device further includes a pair of second elastic members configured to elastically couple the input rotary member and the output rotary member in the rotational direction, and
the input rotary member and the output rotary member each further include a pair of second accommodation portions, one of the pair of second accommodation portions disposed radially outside the plurality of first assembling holes, a remaining one of the pair of second accommodation portions disposed radially outside the plurality of second assembling holes, the pair of second accommodation portions accommodating the pair of second elastic members.

4. The power transmission device according to claim 3, wherein at least the output member is configured such that the one of the pair of second accommodation portions is communicated with at least one of the plurality of first assembling holes disposed radially inside thereof, and the remaining one of the pair of second accommodation portions is communicated with at least one of the plurality of second assembling holes disposed radially inside thereof.

5. The power transmission device according to claim 1, wherein the plurality of assembling holes each allow a fixation member to extend therethrough, the fixation member fixing the flywheel to the drive source-side member.

6. The power transmission device according to claim 1, wherein
the input rotary member includes a first plate and a second plate, the first and second plates fixed to each other in a state of being disposed at an axial interval,
the output rotary member includes a hub and a flange, the hub coupled to the output-side member, the flange extending radially outward from an outer peripheral part of the hub, the flange disposed between the first plate and the second plate, and
the first plate, the second plate, and the flange are each provided with the plurality of assembling holes.

7. The power transmission device according to claim 1, wherein
the damper device further includes a torque limiter unit fixed to an outer peripheral part of the input rotary member, and
the torque limiter unit is fixed at an outer peripheral part thereof with the flywheel, the torque limiter unit configured to transmit the torque in a case in which the torque has a magnitude falling within a preset range.

8. The power transmission device according to claim 7, wherein the torque limiter unit includes
a cover member fixed to the flywheel,
a friction member fixed to the input rotary member,
a pressing member configured to press the friction member against the cover member, and
a release mechanism configured to release a pressing force applied to the friction member by the pressing member.

9. The power transmission device according to claim 8, wherein the release mechanism includes
a screw hole provided in the cover member, and
a screw member screwed into the screw hole to release the pressing force applied by the pressing member.

* * * * *